Dec. 5, 1939. M. B. REACH 2,182,052
PLAY OR GAME BALL
Filed Nov. 30, 1937
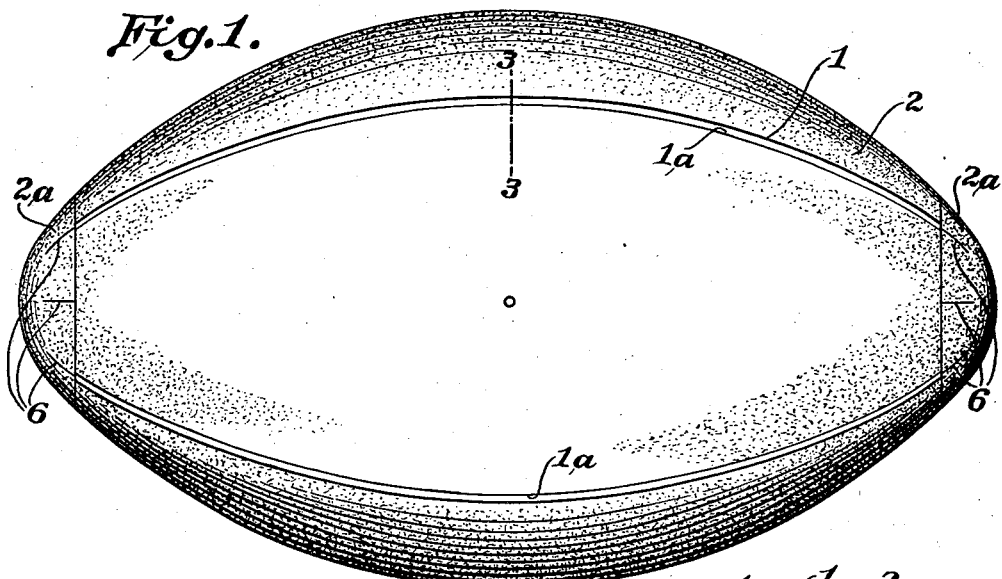
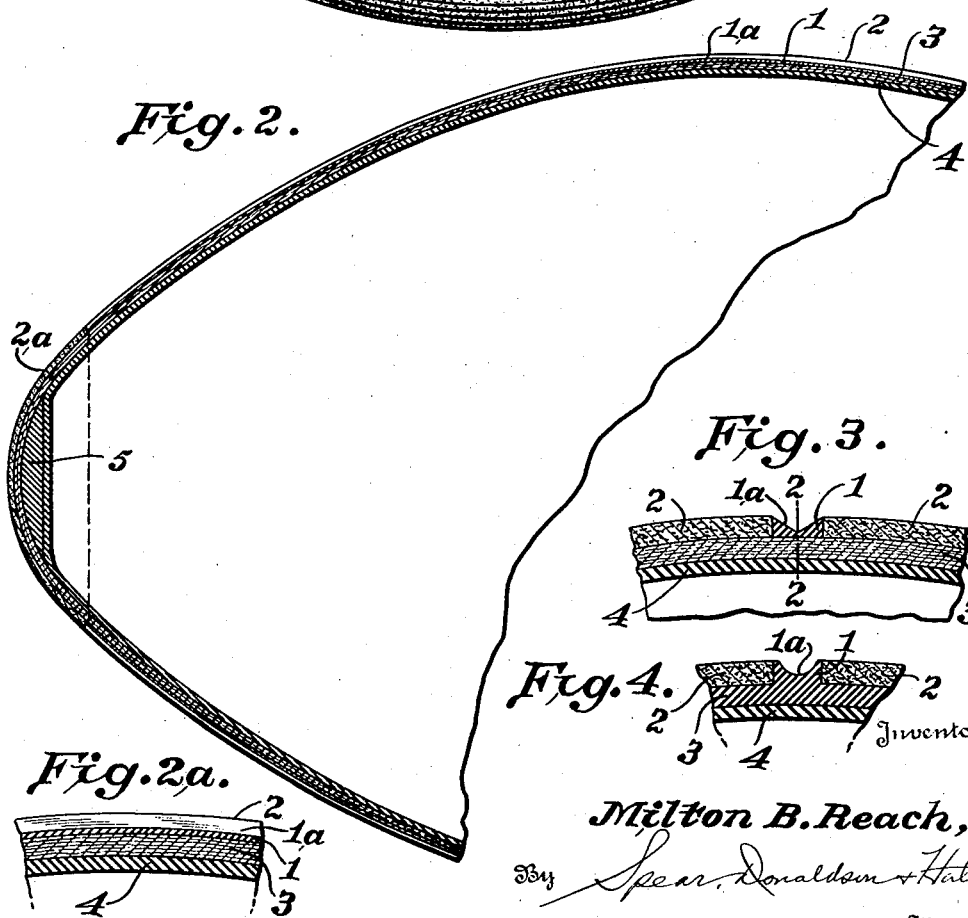
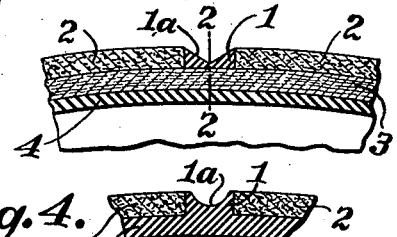
Inventor:
Milton B. Reach,
By Spear, Donaldson + Hall
Attorneys.

UNITED STATES PATENT OFFICE 2,182,052

PLAY OR GAME BALL

Milton B. Reach, Springfield, Mass.

Application November 30, 1937, Serial No. 177,326

6 Claims. (Cl. 273—65)

The invention relates to play or game balls and has for an object the provision of a construction providing rib or ridge portions projecting outwardly from a layer of the carcass or body beneath the cover, edges of the cover being disposed in proximity to the sides of said rib portions, and the outer faces of the rib portions being exposed and provided with a recessed or channeled formation with the object of better control of the ball.

Other objects will appear hereinafter, the invention comprising the features, combination and arrangement of parts as described and as particularly pointed out in the appended claims.

In the drawing

Figure 1 is a view of the invention applied to one type of ball.

Fig. 2 is a fragmentary longitudinal sectional view of the construction of the invention substantially on the line 2—2 of Fig. 3.

Fig. 2a is an enlarged view of a portion of the construction of Fig. 2.

Fig. 3 is an enlarged fragmentary sectional view on line 3—3 of Fig. 1 showing the cross-section of the recessed rib.

Fig. 4 is a view of another form of the invention.

Referring to the drawing, 1 represents the rib or raised portion extending above the carcass or body 3 of the ball, the rib having a recess desirably in the form of a groove or channel 1a in the face thereof, for obtaining an improved control of the ball, which may be of any suitable type, the ball shown being by way of example.

A cover or veneer 2, desirably of panels of leather or other suitable material, is applied with edges thereof substantially in abutting relation to the grooved ribs or raised portions 1, and cemented or otherwise secured to the carcass or body 3 of the ball and with the edges of the cover preferably cemented or otherwise secured to the sides of the rib or raised portions.

Preferably the rib may be molded with the carcass or body of the ball substantially in the manner described in my Patent No. 2,086,094, dated July 6, 1937, having reference also to the method of molding and assembly disclosed in my Patent No. 2,093,737, the form or shape of the rib and the recess or channel in its face, according to the present invention, being determined by the shape of the groove cut in the mold for forming the rib. Although molding the recessed rib with the molding of the layer of the carcass or body of the ball is the preferred method of manufacture, the recess or groove can be otherwise formed as, for example, by cutting or grinding.

The depression or groove in the face of the rib may be of any desired shape or configuration and may be disposed throughout the extent of the rib or in portions thereof as may be desirable to create an air recess or an air channel effect for obtaining a control of the ball.

Desirably the recess formation in the rib is a channel and preferred forms are the angular shaped groove or channel as shown in Fig. 3 or a rounded shaped channel as indicated in Fig. 4. The air channels formed in the rib 1 may be said to create an aerial friction that helps to control the flight of the ball, and control of flight is also contributed to by the firmer finger feel afforded by the channels, as particularly notable in the spiraling forward pass as employed in football.

The sides of the ridge or raised portion 1 and the edges of the cover or veneer of the covering material, which is desirably of leather, are shaped to fit, and conform to each other in abutting relationship. The sides of the rib may be substantially straight and parallel and substantially normal to the surface of the rib and cover, as shown, or they may be of other shape.

The outer edge portions of the rib or raised portion 1 are preferably substantially flush or even with the outer surfaces of the adjoining cover 2, although it will be apparent that the rib may be made to project beyond the surface of the cover as may be desired.

The carcass 3 with which the ridge is preferably molded may be made of rubber or rubber compound as indicated in Fig. 4 or of laminations of balloon cloth as indicated in Fig. 3 impregnated with rubber cement and united together thereby, and may consist of layers united into a homogeneous structure throughout, or it may consist of cement or rubber impregnated canvas of patterns sewed together to produce the desired shape of the ball and submitted to a molding operation, or the carcass may be built up upon a suitable form.

In molding the rib 1 with the carcass or body 3 of the ball, the mold may be recessed to produce the desired shape of recess in the rib, and the rib material, which preferably is a mixture of fibrous material and rubber, is inserted in the mold recesses or channels and in the process of vulcanizing, the carcass and the rib or ridge become integrally united.

Preferably the shape of the mold recess or recesses determines the shape of the recess or recesses in the rib so as to avoid the necessity for any subsequent grinding or finishing operation.

The ball may be of the type to be inflated, and may have a bladder 4 of rubber, or it may be of solid type such as in my patent above mentioned.

While the invention is shown in connection with a foot ball it may be embodied in other forms of balls.

A desirable end construction for the type of ball chosen to illustrate the invention may comprise a suitably shaped end piece 5 of rubber or other suitable material which overlies the bladder 4 and which is covered by the body or carcass 3 of the ball. The veneer cover panels 2 may desirably terminate short of the ends of the ball, and a suitably shaped and constructed cap 2a of covering material adjoins the cover panels 2 and caps the ball end. The cap 2a may be formed from a piece of leather or the like, having notches or cuts in its edge as at 6 which facilitate the shaping of the cap.

I claim:

1. In a play or game ball, a body portion, a ridge portion thereon projecting outwardly from the body portion, said ridge portion having a recess in its outer face, and a covering layer having edges substantially abutting the sides of said recessed ridge portion, said recess being exposed between the edges of said covering layer and extending inwardly within the outer surface of the covering layer.

2. In a play or game ball, a body portion, a ridge portion thereon and projecting outwardly from the body portion, said ridge portion having a recess in its outer face, and a covering layer having edges substantially abutting the sides of said recessed ridge portion, the outer edges of the ridge portion being substantially flush with the adjoining outer surface of the cover.

3. In a play or game ball, a body portion, a ridge portion thereon, and projecting outwardly from the body portion, said ridge portion having a channel in its outer face extending longitudinally thereof, and a covering layer having edges substantially abutting the sides of said channeled ridge portion, said channel being exposed between the edges of said covering layer and extending inwardly within the outer surface of the covering layer.

4. In a play or game ball, a body portion, a ridge portion thereon and projecting outwardly from the body portion, said ridge portion having a channel in its outer face extending longitudinally thereof, and a covering layer having edges substantially abutting the sides of said channeled ridge portion, the outer edges of the ridge portion being substantially flush with the adjoining outer surface of the cover.

5. A play or game ball having a body portion and having a ridge portion molded integrally with said body portion and projecting outwardly therefrom, said ridge portion having a recess molded in its outer face, and a covering layer applied to said body portion with edges of said covering layer substantially abutting the sides of said recessed ridge portion, the outer edges of the ridge portion being substantially flush with the adjoining outer surface of the cover.

6. A play or game ball having a body portion and having a ridge portion molded integrally with said body portion and projecting outwardly therefrom, said ridge portion having a channel molded in its outer face, extending longitudinally thereof, and a covering layer applied to said body portion with edges of said covering layer substantially abutting the sides of said channeled ridge portion, the outer edges of the ridge portion being substantially flush with the adjoining outer surface of the cover.

MILTON B. REACH.